Jan. 23, 1940.  P. STEINACKER  2,187,990
CLARIFYING PROCESS FOR MOLASSES
Filed April 14, 1938
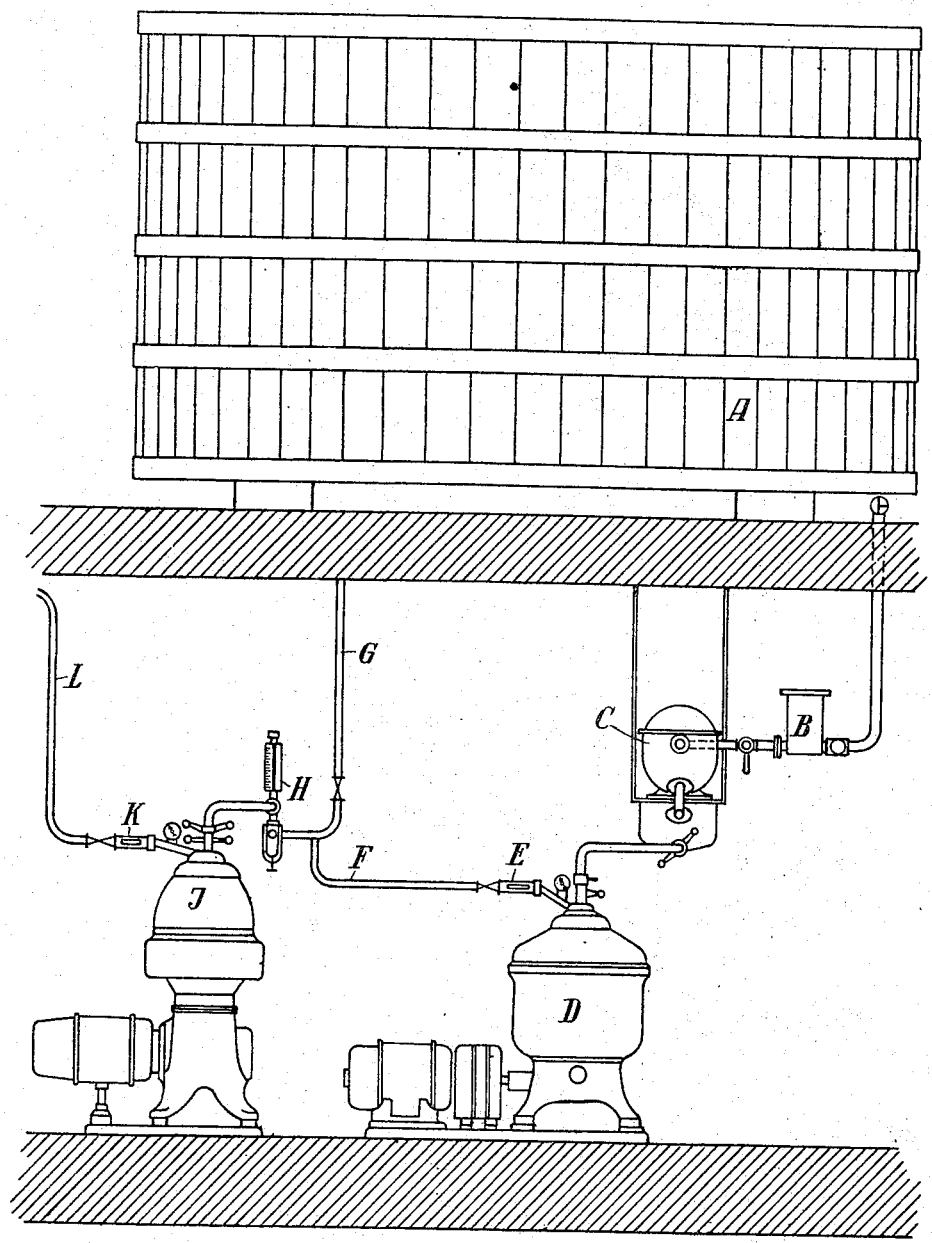
Inventor:
Peter Steinacker
by
his Attorney Patented Jan. 23, 1940

2,187,990

UNITED STATES PATENT OFFICE 2,187,990

CLARIFYING PROCESS FOR MOLASSES

Peter Steinacker, Oelde, Westphalia, Germany

Application April 14, 1938, Serial No. 201,997
In Germany April 30, 1937

1 Claim. (Cl. 195—85)

In the preparation of molasses for the production of pressed yeast by centrifugal clarification the molasses solution is either diluted only with water and heated or is admixed with chemicals which serve partly for purifying and partly come into question as necessary addition for the nutriment solution.

The dirt contained in the molasses is very varied in nature and it is consequently necessary, before the separation, either to take samples of dirt or as a precautionary measure to interrupt the centrifuging prematurely and to carry out a drum purification. It has therefore been proposed to clarify the molasses by centrifuging with continuous mud discharge, the material being at the same time divided into a pure nutrient solution and a dirt concentrate. For reducing the losses, the dirt concentrate is diluted with water and separated into a clear and a dirty product in a second centrifuging operation. It is known that many of the substances contained in the molasses, especially the inorganic substances, dissolve at higher dilution, and on this account the centrifugal clarification is usually carried out with a dilution of about 40° Ball. On the other hand there are substances which are so finely distributed and of such a specific gravity that they can only be separated at slight concentration with an economically sufficient quantitative efficiency of the centrifuging machine.

The invention consists in that the known purification of the molasses by centrifuging is carried out in two stages at different concentrations, the material being purified the first time at higher concentration, preferably 40 to 50° Ball. and a second time at lower concentration, preferably 15 to 25° Ball. The result of this procedure is, that the impurities, which dissolve at stronger dilution, are centrifugally separated at higher concentration of the molasses. This is preferably done in a centrifugal machine with very large mud space, because the percentage of these substances constitutes the major portion of the material. The molasses concentration is in this instance preferably about 40 to 50° Ball. or higher.

The molasses are diluted with water to a concentration of 15–25° Ball. immediately after the first centrifuging operation. The final clarification takes place preferably at high speed and in a centrifuging drum with a high separating capacity, which drum must necessarily have a relatively small mud space. At the second centrifuging operation, however, only a very small mud space is required because the percentage of the specifically lighter, mainly organic foreign bodies in the molasses is low. Subsequently the molasses flow into the fermentation vat in a continuous stream or through an intermediate vessel.

In view of the relatively small mud space available in the centrifugal drums hitherto generally employed the addition of admixtures forming precipitates to the molasses has hitherto been avoided and, for example, diammonium phosphate is employed instead of the superphosphates frequently used in a chemical pre-treatment in combination with the settling process. Superphosphate solutions have already been added to the molasses before the centrifugal clarification, but then either the superphosphate solution was allowed to stand so that the foreign substances could settle on the bottom or the centrifugal clarification was interrupted and repeated drum clarification carried out. The great advantages offered by the centrifugal clarification in the preparation of the molasses for the manufacture of pressed yeast were thereby not fully utilized.

According to the invention, however, it is possible, to mix the superphosphate solution directly with the molasses without allowing it to stand or without clarification by any other means, because the mud space of the pre-clarifying centrifuge is sufficiently large to also accommodate the impurities also separating out of this nutrient substance.

A plant for carrying out the invention is illustrated by way of example in the accompanying drawing.

The concentrated molasses flow out of the vat A through a coarse strainer B and a measuring instrument C for measuring the quantities flowing through the large space centrifuge D. The centrifuged molasses encounters through an inspection glass E flowing along the conduit F the fresh water conduit G and is thus diluted according to the given proportion. After the quantity of diluted molasses has been ascertained by a through-flow meter H, the molasses flow to the fine clarifying centrifuge J. The finished clarified molasses are conducted through an inspection glass K through the conduit L to the yeast producer or collecting tank.

I claim:

A process of producing pressed yeast, consisting in centrifuging molasses untreated by purifying chemicals, and afterwards subjecting the so clarified molasses to fermentation, the centrifuging action being executed in two stages in the first of which the molasses are initially centrifuged in a highly concentrated state of about 40 to 50° Ball. to eliminate the heavy mud therefrom, whereas in the second stage the molasses are, after dilution with water, centrifuged in a state of low concentration of about 15 to 25° Ball.

PETER STEINACKER.